April 22, 1924.

C. E. REDDIG 1,491,360

BASKET FOR DISHWASHING MACHINES

Filed Aug. 11, 1920

Inventor:
Charles E. Reddig

By Howard M. Cross
Atty.

Patented Apr. 22, 1924.

1,491,360

UNITED STATES PATENT OFFICE.

CHARLES E. REDDIG, OF KEW GARDEN, NEW YORK, ASSIGNOR TO WESTERN ELECTRIC COMPANY, INCORPORATED, OF NEW YORK, N. Y., A CORPORATION OF NEW YORK.

BASKET FOR DISHWASHING MACHINES.

Application filed August 11, 1920. Serial No. 402,849.

*To all whom it may concern:*

Be it known that I, CHARLES E. REDDIG, a citizen of the United States, residing at Kew Garden, Richmond Hill, in the county of Queens and State of New York, have invented certain new and useful Improvements in Baskets for Dishwashing Machines, of which the following is a full, clear, concise, and exact description.

This invention relates to baskets used in dish washing machines for supporting articles to be washed, and particularly eating utensils such as knives, forks and spoons.

The general object of the invention is to provide a form of basket which will tend to hold the eating utensils separated from one another, thereby facilitating their washing. In its preferred embodiment, the invention is characterized by the provision of teeth which project inwardly from the mouth of the basket and tend to separate the eating utensils from one another.

Figure 1:
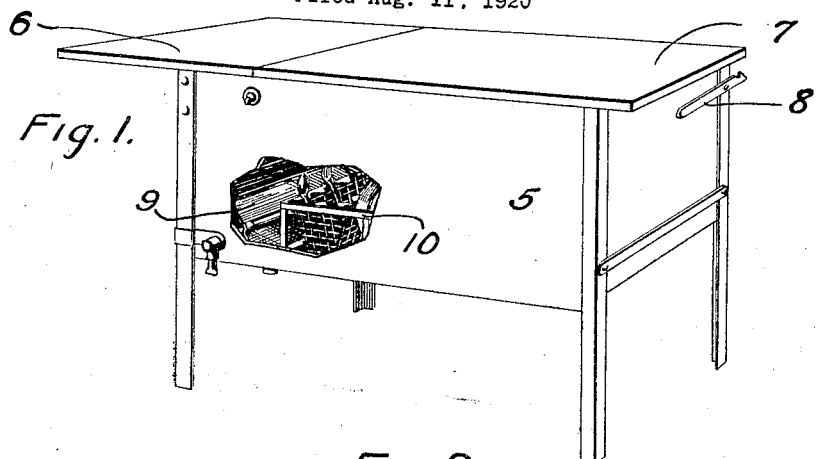
Figure 2:
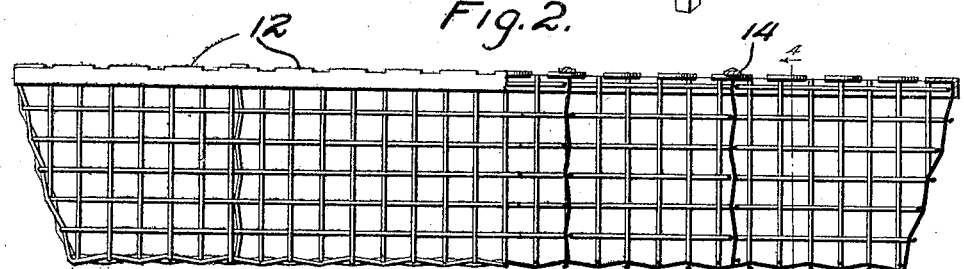
Figure 3:
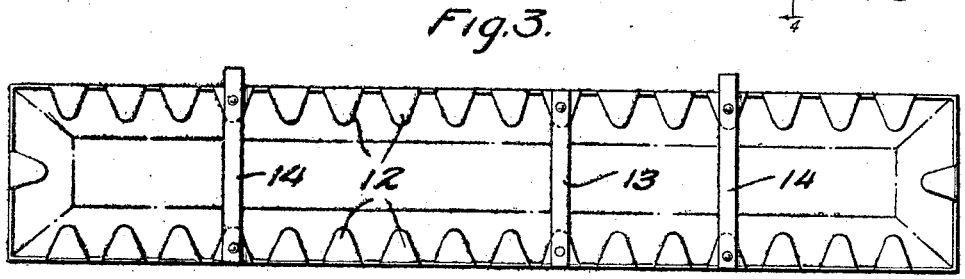

For the purpose of illustration, the invention is shown in the accompanying drawing as applied to a dish washing machine of well known kind; but it is obvious that it is not limited in its application to any particular kind of dish washing machine. In the drawing, Fig. 1 is a perspective view of a dish washing machine having the invention embodied therein, a portion of the casing being broken away so as to show the utensil supporting basket; Fig. 2 is a side elevation of the utensil supporting basket, a portion being broken away to facilitate illustration; Fig. 3 is a top plan view of said basket; and Fig. 4 is a sectional elevation of line 4—4 of Fig. 2.

Referring to the drawing, and particularly to Fig. 1, the dish washing machine therein illustrated is of a well known form having a body portion 5 mounted on suitable legs, a fixed shelf 6, and a hinged cover 7 which may be held in open position by a latch member 8. Mounted for revolution inside of the body portion 5 is a paddle wheel 9 which may be driven by an electric motor (not shown) and which serves to stir the water and throw it over the dishes and eating utensils to be washed. The dishes to be washed are supported in a removable rack or tray 10.

Figure 4:
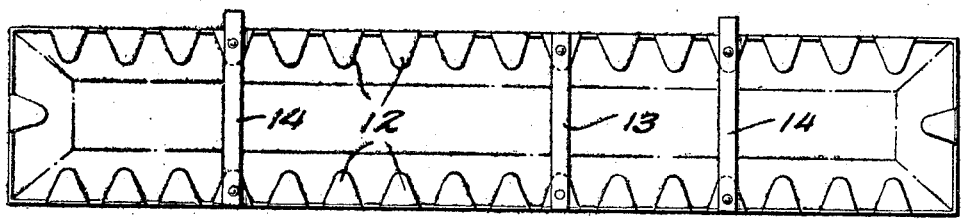

According to the present invention, the dish holding rack 10 is adapted to receive a utensil basket which is shown in perspective in Fig. 1 and in detail in Figs. 2, 3 and 4. This basket is preferably made of woven wire and is of the general form shown in the drawing. The mouth of the basket is provided with inwardly projecting teeth of any suitable form. In the construction shown, the teeth 12 are shown as integral with a sheet metal binding which surrounds the mouth of the basket and is secured thereto. The basket may be strengthened if desired by one or more bridge members 13 attached to certain opposite teeth; and in order to provide for removable mounting of the basket on the dish rack, certain of said bridge members are in the form of hook members 14 which extend beyond the edge of the basket, as best shown in Fig. 4.

With the construction of utensil basket above described, it is obvious that knives, forks and spoons when dropped into the basket will fall between the teeth 12 which will hold them separated and will facilitate their washing. For convenience the word utensil has been used in the specification and claims to designate knives, forks, spoons, silverware, etc.

What is claimed is:

1. In a dish washing machine, a utensil basket having a binding around the top thereof, said binding having its upper edge bent over the mouth of the basket, and provided with teeth projecting inwardly to establish spacing between the utensils.

2. A basket having a binding around the mouth thereof provided with inwardly projecting teeth, and hook members attached to certain opposite teeth and projecting across the top and over the edge of the basket.

3. A utensil basket having a binding around the mouth thereof provided with inwardly projecting teeth and hook members attached to certain of said teeth for cooperating with a support for the basket.

In witness whereof, I hereunto subscribe my name this 6th day of August A. D., 1920.

CHARLES E. REDDIG.